United States Patent [19]

Tadokoro

[11] Patent Number: 5,130,818
[45] Date of Patent: Jul. 14, 1992

[54] COMMUNICATION TERMINAL APPARATUS, AND COMMUNICATION METHOD

[75] Inventor: Yoshihisa Tadokoro, Yokohama, Japan

[73] Assignee: Canon Kabushiki Kaisha, Tokyo, Japan

[21] Appl. No.: 507,887

[22] Filed: Apr. 12, 1990

[30] Foreign Application Priority Data

Apr. 18, 1989 [JP] Japan ................ 1-96510
Apr. 18, 1989 [JP] Japan ................ 1-96511
May 11, 1989 [JP] Japan ................ 1-119737

[51] Int. Cl.⁵ ........................... H04N 1/00
[52] U.S. Cl. .................... 358/407; 358/402; 370/110.1
[58] Field of Search ........... 358/400, 401, 403, 404, 358/405, 407, 434, 435, 436, 439, 440, 402; 370/110.1

[56] References Cited

U.S. PATENT DOCUMENTS 4,807,044  2/1989  Kikuchi et al. ............. 358/448
4,994,926  2/1991  Gordon et al. ............. 358/434
4,995,073  2/1991  Okata et al. ............... 370/110.1
5,001,709  3/1991  Satoh ...................... 370/110.1

FOREIGN PATENT DOCUMENTS 63-105544  10/1988  Japan .

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A communication terminal apparatus connected to an ISDN treats communication information as being confidential in accordance with the result of a comparison between a subaddress received along with the communication information and confidentiality information stored in advance and corresponding to the subaddress, or analyzes confidentiality information contained at a subaddress and treats communication information as being confidential based on the results of the analysis. Also disclosed is a communication terminal apparatus connected to an ISDN for adding specific destination information to communication information in accordance with the result of a comparison between a subaddress received along with the communication information and destination information stored in advance and corresponding to the subaddress.

9 Claims, 12 Drawing Sheets

| SUBADDRESS (F41) | CONFIDENTIALITY INFORMATION (F43) | |
|---|---|---|
| | STORAGE AREA NUMBER | SECRET NUMBER (F42) |
| 0 | NONE | NONE |
| 1 | 01 | #345 |
| 2 | NONE | NONE |
| 3 | 02 | #3656 |
| ⋮ | ⋮ | ⋮ |

F44

| SUBADDRESS | CONFIDENTIALITY INFORMATION | |
| --- | --- | --- |
| | STORAGE AREA NUMBER | SECRET NUMBER |
| 0 | NONE | NONE |
| 1 | 01 | #345 |
| 2 | NONE | NONE |
| 3 | 02 | #3656 |
| ⋮ | ⋮ | ⋮ |

F3 : CONFIDENTIALITY DESIGNATING COMMAND SECTION

F4 : STORAGE AREA NUMBER SECTION

F5 : SECRET NUMBER SECTION

F6 : CONFIDENTIALITY INFORMATION SECTION

| | F11 | F12 |
|---|---|---|
| | SUBADDRESS | ADDITIONAL INFORMATION |
| | 000 | "MR. AB" |
| | 001 | "CD SECTION" |
| | 002 | "EF SECTION CHIEF" |
| | 003 | "MR. GH" |

FIG. 11

COMMUNICATION TERMINAL APPARATUS, AND COMMUNICATION METHOD

BACKGROUND OF THE INVENTION

1. Field of the Invention

This invention relates to a communication terminal apparatus connected to an ISDN, i.e. an Integrated Services Digital Network, confidentiality processing as well as the recording of information relating to the destination of a received document. The invention relates also to a communication method using such a communication terminal apparatus.

2. Description of the Prior Art

A confidential service using a communication terminal apparatus is utilized in the transmission of document information requiring the maintenance of secrecy.

A typical example of a communication terminal apparatus for sending and receiving confidential messages is a facsimile apparatus. When a confidential document is received, a communication terminal apparatus such as a facsimile apparatus used in confidential communication operates to store the received document as a confidential document in response to an instruction from a sending terminal possessing a confidential document transmission function. The document stored as the result of confidentiality processing can be extracted after processing from a so-called memory box (storage device), with which the terminal on the receiving side is equipped, by a specific person using a specific number.

In a conventional facsimile apparatus, only an indication of the sender's number, namely the number of the party sending the document, is provided as additional information recorded along with the received document.

Thus, the conventional communication terminal apparatus is such that unless the sending side possesses a confidential document transmission function, the sending and receiving of confidential documents, namely confidential communication, cannot be carried out even if the receiving side has memory means such as a memory box and a confidential document receiving function. As a result, a limitation is imposed upon the number of users capable of utilizing a confidential service.

If an attempt is made to perform a confidential transmission between two parties, the sending side must specially install an apparatus having the confidential document transmission function, and the receiving side must specially install an apparatus having the confidential document receiving function. Further, though the identity of the sending party is known with the above-mentioned conventional facsimile apparatus, there are cases in which one facsimile apparatus is used jointly by a plurality of persons and the name of the party to receive the document is not written on the received document as its destination. In such cases, whom the document is intended for is unclear unless the contents of the received document are read.

SUMMARY OF THE INVENTION

An object of the present invention is to provide a communication terminal apparatus and a communication method capable of eliminating the aforementioned disadvantages and inconveniences.

Another object of the present invention is to provide a communication terminal apparatus connected to an ISDN, in which confidentiality information for receiving a confidential document is capable of being registered for each of a plurality of subaddresses and confidentiality processing of a received document is carried out based on registered confidentiality information conforming to reception of each subaddress, whereby it is made possible to receive a confidential document by a terminal apparatus on the receiving side even if the terminal apparatus on the sending side does not possess a conventional confidential document transmission function.

A further object of the present invention is to send and receive messages using, as a terminal on the sending side, an ISDN terminal having a subaddress transmitting function, and using, as a terminal on the receiving side, an ISDN terminal possessing a function for registering confidentiality information for every subaddress, as well as a function for performing confidentiality processing of received messages employing registered confidentiality information, whereby the transmission and reception of confidential messages utilizing the ISDN is made possible merely by the information contained in the subaddresses, thus widening the utilization of confidential services.

Still another object of the invention is to provide a communication terminal apparatus in which, if the name of the receiving party is not written on a received document in a terminal apparatus, especially a facsimile apparatus, connected to an ISDN, subaddresses of the ISDN are assigned to destination information, the destination information is decoded on the receiving side and is then recorded on the received recording paper together with the received document, thereby making it possible to readily determine to whom the document has been sent.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a diagram illustrating the structure of a table of additional information in the facsimile apparatus according to the third embodiment;

DESCRIPTION OF THE PREFERRED EMBODIMENTS

First Embodiment

Figure 1:
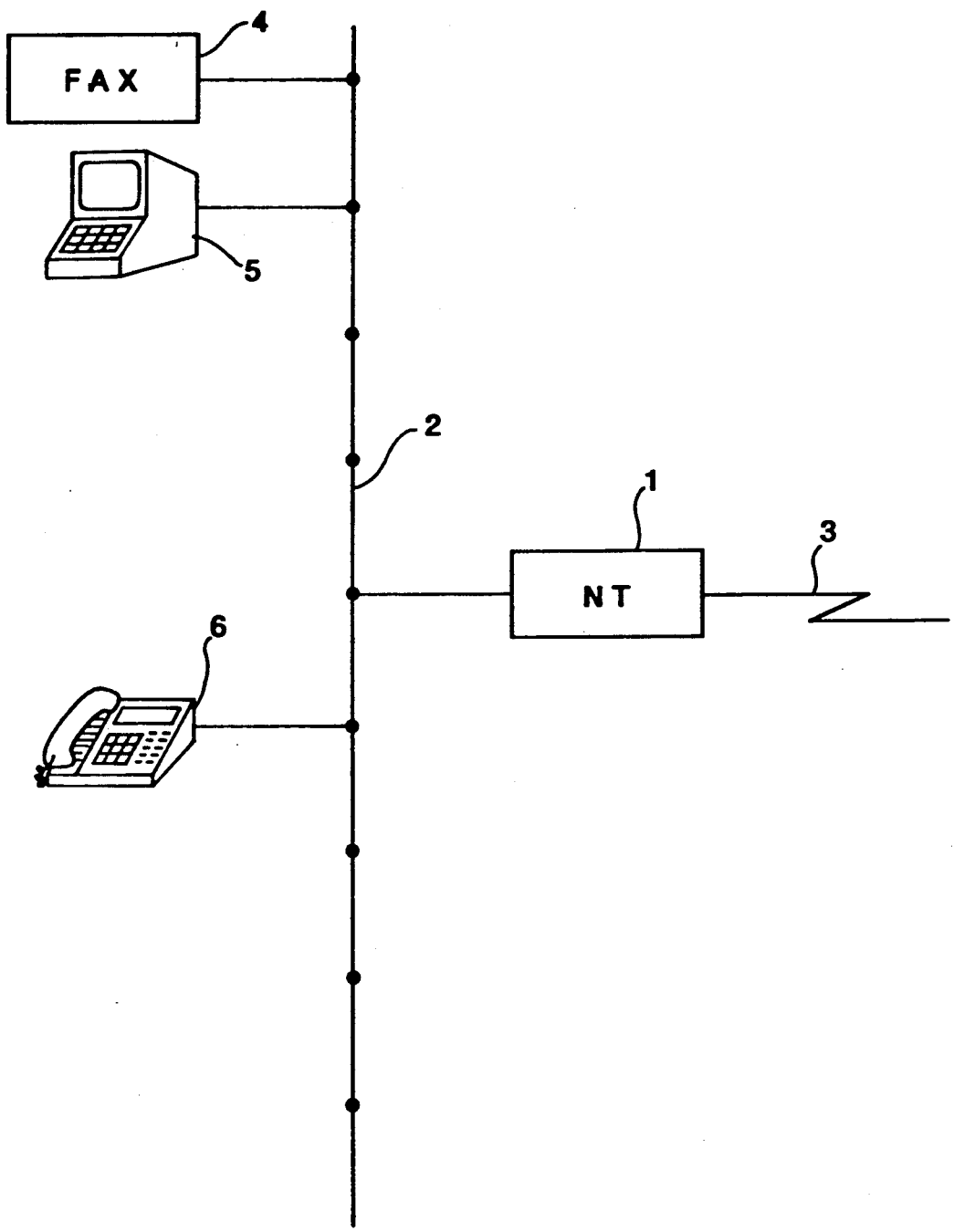
FIG. 1 is a connection diagram illustrating a facsimile apparatus embodying the present invention in a state connected to an ISDN.

FIG. 1 is a connection diagram showing a facsimile apparatus according to the present embodiment in a state connected to an ISDN. The connection is made in the basic interface of an ISDN to which the present invention can be applied.

In an ISDN terminal system, a network terminal (NT) 1 is connected to the subscriber line of a user in an ISDN, as shown in FIG. 1. Specifically, the network terminal 1 terminates a subscriber line 3 and is connected to a bus line 2 to which a plurality of terminal devices are connected.

A facsimile apparatus (FAX) 4 of the embodiment is connected to the bus line 2. Also connected to the bus line 2 are a telex apparatus 5 and a digital telephone 6.

In this wiring scheme, namely a 1:n wiring (bus wiring) scheme, in which a plurality of terminals such as a facsimile apparatus and telex apparatus are connected to a bus as ISDN terminals, it is possible for a user having one subscriber line to connect up to a maximum of eight terminals.

Figure 2:
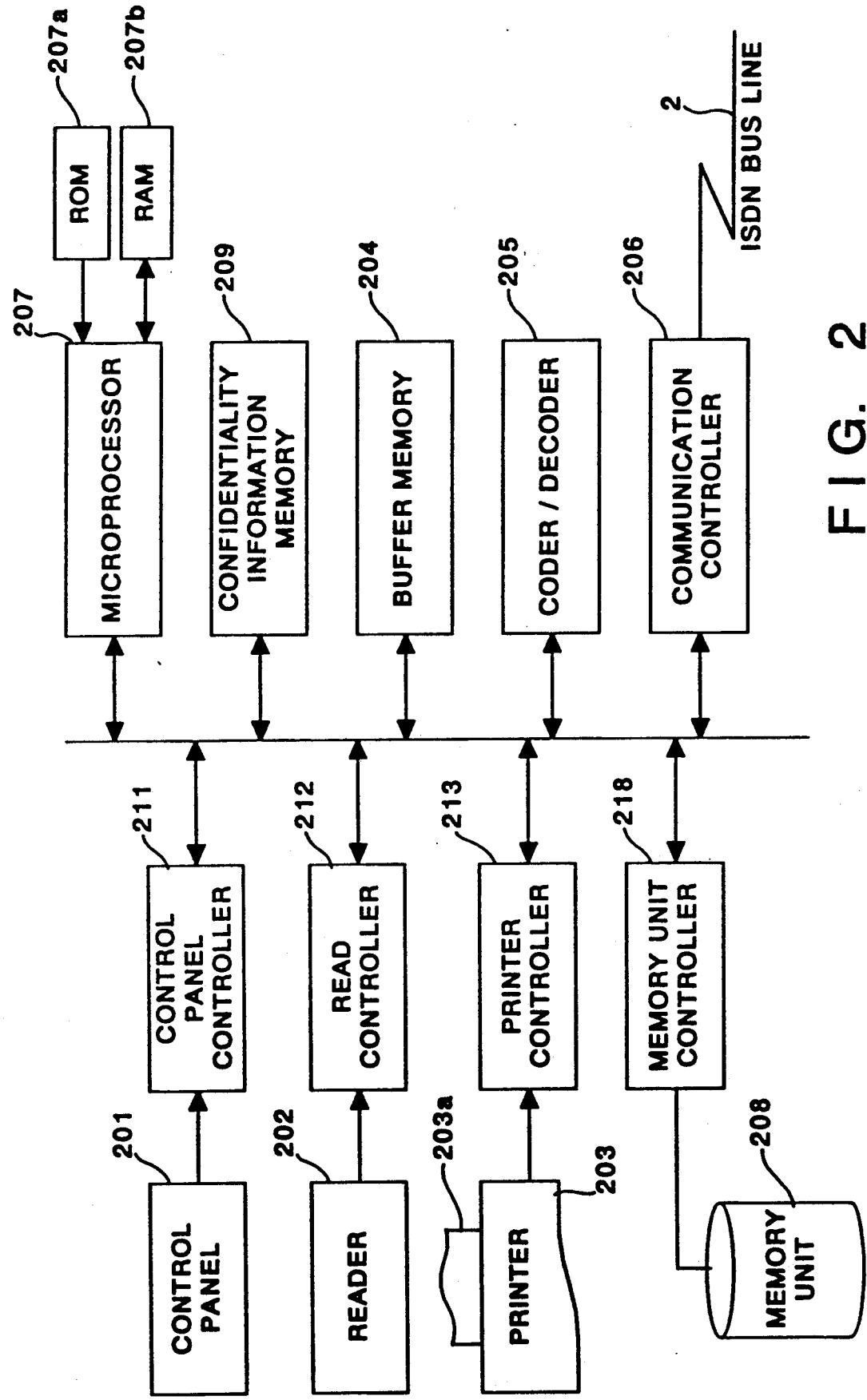
FIG. 2 is a block diagram illustrating the construction of a facsimile apparatus according to first and second embodiments.

FIG. 2 is a block diagram showing the construction of a facsimile apparatus according to the present embodiment.

As shown in FIG. 2, the facsimile apparatus comprises a control panel 201 having numeric keys manipulated by the operator (user), as well as various switches, a reader 202 comprising an optical system or CCD line sensor for reading a document, a printer 203 constituted by a dot printer such as a laser-beam printer (LBP) or thermal transfer printer for transferring the ink from an ink ribbon to ordinary paper by a thermal head, a buffer memory 204 for storing image data, a coder/decoder 205 for compressing or expanding image data, a communication controller 206, and a microprocessor 207 serving as a main controller for controlling the overall facsimile apparatus.

The microprocessor 207 has a ROM 207a storing a control program for the overall facsimile apparatus, and a RAM 207b for temporarily storing control data.

The facsimile apparatus further includes a control panel control unit 211 for controlling the control panel 201, a read controller 212 for controlling the reader 202, and a printer controller 213 for controlling the printer 203.

The communication controller 206 is connected to the ISDN bus line 2. The facsimile apparatus is accommodated in the ISDN along with other terminals by the connection arrangement shown in FIG. 1. Document information is transmitted to and received from another party's terminal through the ISDN by way of the communication controller 206.

In accordance with the present embodiment, the communication terminal apparatus having the above-described construction is used to register confidentiality information for receiving a confidential document in correspondence with a subaddress in accordance with a CCITT advisory, and to execute received-document confidentiality processing employing the registered confidentiality information in conformity with the subaddress received.

As shown in FIG. 2, the present facsimile apparatus includes, in addition to the sending/receiving function of a facsimile terminal having the foregoing construction, a memory unit 208 using a non-volatile memory such as a hard disk, and a confidentiality information memory unit 209 in which confidentiality information, described below, is registered and stored in advance. The memory unit 208 constitutes a memory box in a case where a confidential document is received. Confidentiality processing is executed through a memory unit controller 218 under the control of the microprocessor 207. Storage of a confidential document is performed utilizing subaddresses.

With an ISDN that can be expected to provide a variety of services in modern society which relies greatly upon sophisticated information, call setting messages include various information elements. These messages contain subaddresses.

Figures 3, 4:
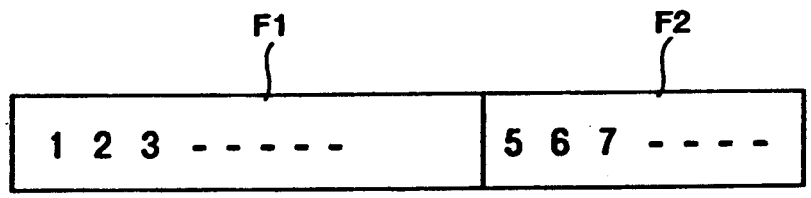
FIG. 3 is a diagram illustrating an ISDN number system based on a CCITT advisory-.
FIG. 4 is a diagram illustrating the structure of a confidentiality table in a facsimile apparatus according to the first embodiment.

With regard to a number scheme in an ISDN, stipulations concerning the structure and assignment of these numbers are made in accordance with CCITT advisories. FIG. 3 illustrates an ISDN number system. As shown in FIG. 3, F1 represents a subscriber number section, and F2 denotes a subaddress section. These constitute an ISDN address.

A confidentiality table comprising the items described below is set in the confidentiality information memory 209, taking note of such an ISDN number system.

FIG. 4 illustrates an example of the structure of a confidentiality table in which confidentiality information corresponding to subaddresses is registered. In FIG. 4, F41 denotes a subaddress section, F42 a confidentiality information section, F43 a storage area number, and F44 a secret number. In the confidentiality information section F42, the storage area number section F43 shows prescribed storage areas assigned beforehand in the memory unit 208 in dependence upon the number information. A storage area can be set in correspondence with each subaddress. When number information (the second and fourth rows in the example of FIG. 4) regarding storage areas has been set in this confidentiality table, the facsimile apparatus does not output a received document immediately but stores it in the assigned storage address area of the memory unit 208 that corresponds to the relevant number. The secret number F44 is number information to which a collation is to be made when a confidential document that has been stored is outputted.

The above-described confidentiality table for receiving a confidential document is stored beforehand in the confidentiality information memory 209 of the facsimile apparatus constituting the ISDN terminal system. At the time of an incoming call, the microprocessor 207 executes confidentiality processing of a received document using the registered confidentiality information in the confidentiality table.

The microprocessor 207 executes storage of a confidential document and output of a confidential document in accordance with a control program, which is indicated by a flowchart described below, stored beforehand in the ROM 207a. More specifically, when there is an incoming call from another party's terminal by way of the ISDN, the microprocessor 207 executes processing in accordance with the control program in the ROM 207a based on whether or not there is a subaddress, and information stored in the confidentiality table. In case of confidentiality processing, the microprocessor 207 performs a storage operation by controlling the memory unit controller 218 in such a manner that the received document is stored in the memory unit 208 at the storage location thereof corresponding to the received subaddress.

Confidentiality processing performed by the facsimile apparatus of the present embodiment will now be described in accordance with the flowcharts of FIGS. 5 and 6.

Figure 5:
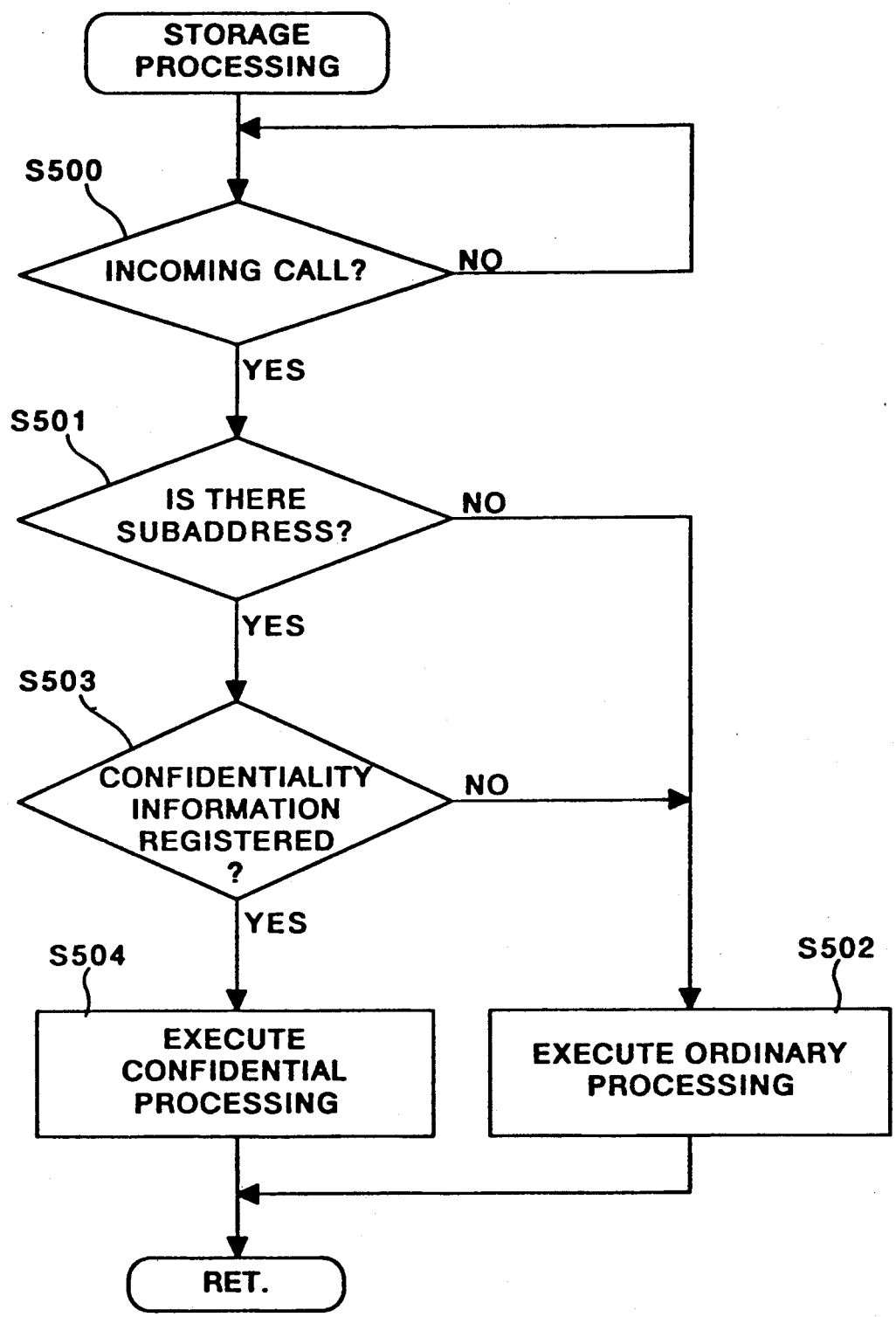
FIG. 5 is a flowchart illustrating confidential document storage processing in the facsimile apparatus of the first embodiment.

FIG. 5 is a flowchart illustrating processing for storing a confidential document in the present facsimile apparatus.

As shown in FIG. 5, the communication controller 206 detects an incoming call from the ISDN bus line 2 at step S500. If an incoming call is detected, it is determined at step S501 whether there is a subaddress. If the decision rendered is NO, meaning that there is no address, the program proceeds to step S502 and ordinary reception processing is executed. Specifically, the received document is decoded by the coder/decoder 205, and the image signal obtained is stored in the buffer memory 204. Thereafter, the image signal is fed into the printer controller 213 from the buffer memory 204, and an image is printed on recording paper 203a by the printer If a subaddress is detected at step S501, on the other hand, the program proceeds to step S503, at which retrieval of the confidentiality table in confidentiality memory unit 209 is executed. That is, it is determined at step S503 whether confidentiality information corresponding to a received subaddress has been registered in the confidentiality information memory unit 209. Based on the decision, ordinary processing or confidentiality processing is executed next.

As already described, confidentiality information F42 corresponding to a subaddress is set in the confidentiality table, as shown in FIG. 4. In the case of the illustrated example, the registered items with regard to subaddresses "0" and "2" are "NONE" (the first and third rows), whereas storage area numbers and secret numbers are registered with regard to the subaddresses "1" and "3", as mentioned above. Whether or not confidentiality information has been registered is determined at step S503. When information has been registered, or in other words, when a storage area for receiving a confidential document has been set in the memory unit 208, this is regarded as meaning that the received document requires confidential treatment, and therefore the received document is so treated. Confidential treatment on the receiving side is decided by whether or not the sending side has transmitted a subaddress in relation to transmission of the document.

Confidential treatment is not implemented in a case where no storage area number has been registered. That is, if the decision rendered at step S503 is NO (meaning that confidentiality information has not been registered on the receiving side, as a result of which a storage area has not been set in the memory unit 208), this is regarded as signifying that the received document is not desired to be treated confidentially, and therefore the program proceeds to step S502 to execute ordinary processing, described above. The program returns at the conclusion of this processing.

If a YES decision is rendered at step S503, namely that confidentiality information has been registered, the program proceeds to step S504 so that the received document is treated with confidentiality by executing confidentiality processing, as described earlier. That is, processing is executed in such a manner that the received document is stored as a confidential document in the corresponding prescribed storage area provided in the memory unit 208.

Thus, the facsimile apparatus serving as the communication terminal apparatus having the foregoing construction is provided with a function for registering confidentiality information in correspondence with subaddresses, and a function for performing confidentiality processing of a received document using the registered confidentiality information, thereby making it possible to execute confidentiality processing on the receiving side even if the communication terminal on the sending side does not have a confidential document transmission function.

Processing for outputting a received document subjected to confidentiality processing as set forth above will now be described in accordance with the flowchart of FIG. 6.

Figure 6:
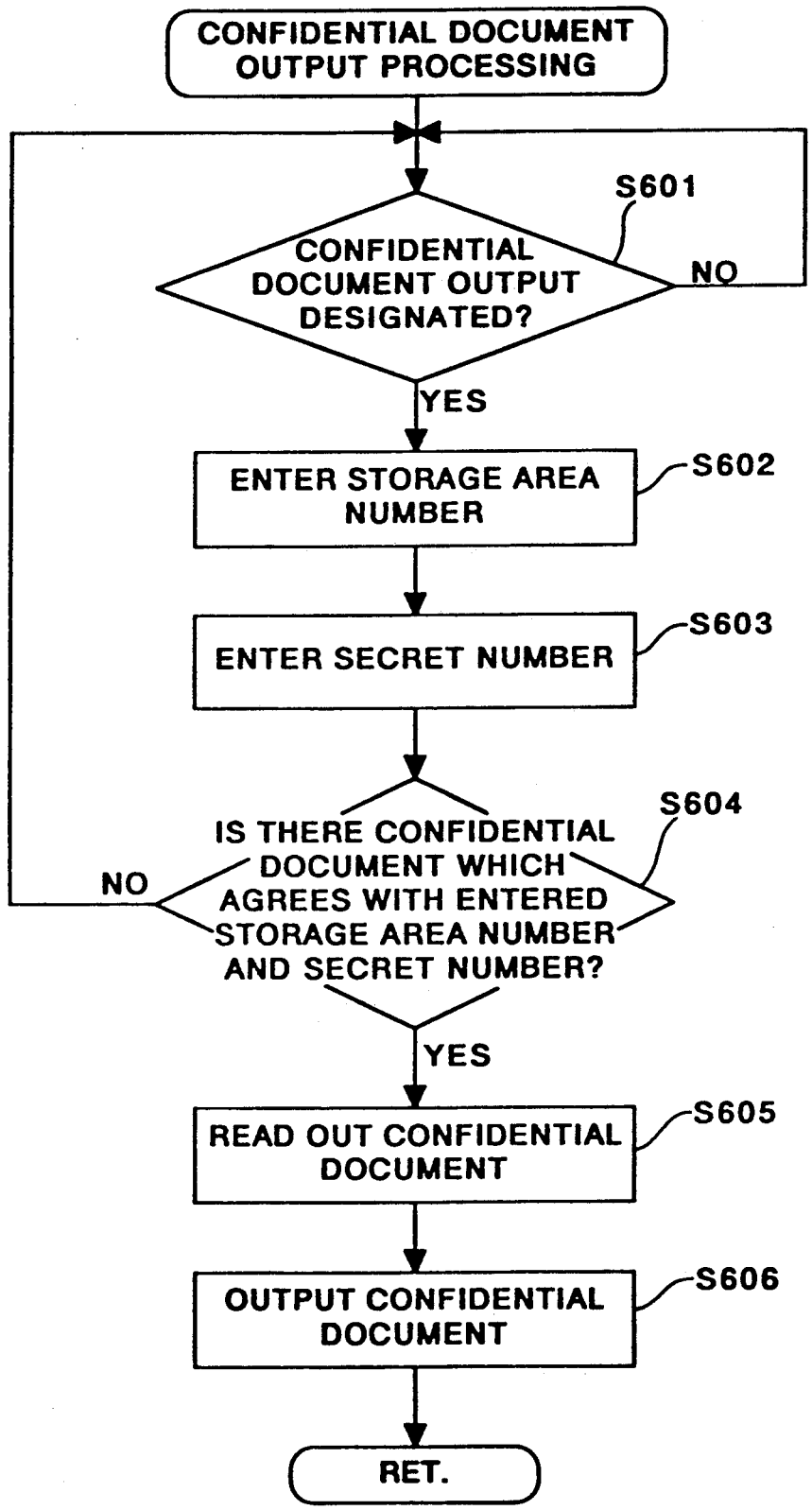
FIG. 6 is a flowchart illustrating output processing of a received document in the facsimile apparatus of the first embodiment.

As shown in FIG. 6, whether output of a confidential document has been instructed is sensed at step S601 by manipulation of the control panel 201 by the operator. If output has been instructed (i.e., when the answer at step S601 is YES), the program proceeds to step S602, at which input of a storage area number is received from the control panel 201, and then to step S603, at which input of a secret number is received from the operator. After these items of input information have been read, the program proceeds to a decision step S604. If a confidential document agreeing with the inputted storage location number and the secret number is present in the memory unit 208, then the program proceeds to step S605, at which the pertinent confidential document is read out, decoded by the coder/decoder 205 and stored in the buffer memory 204. Next, at step S606, the confidential document data are read out of the buffer memory 204 in successive fashion, the data are sent to the printer 203 via the printer controller 213, and the data are recorded on the recording paper 203a thereby. Processing is then terminated.

On the other hand, if a confidential document agreeing with the inputted storage location number, etc., is found not to be present in the memory unit 208 at step S604, then the program returns to step S601.

The operation for outputting a confidential document is thus carried out. As long as the confidential document does not agree with both the storage area number and the secret number, the confidential document will not be outputted. Thus, the secrecy of a received confidential document that has been stored is maintained with assurance.

In accordance with the present embodiment as described above, a confidential document can be received by the terminal apparatus on the received side even if the apparatus on the sending side does not possess the conventional function for transmitting a confidential document. In addition, the sending side need not possess a special function for designating confidentiality, for it will be possible to send and receive a confidential document if the sending side is merely provided with a function for transmitting subaddresses of an ISDN. This has the effect of readily expanding the utilization of confidential services between ISDN users.

It should be noted that while the foregoing embodiment has been described in the case of a facsimile apparatus, the invention is not limited to this embodiment. The invention can be similarly applied to communication terminal apparatus other than a facsimile apparatus, such as a telex apparatus, by way of example.

Second Embodiment

In the same manner as the facsimile apparatus of the first embodiment shown in FIG. 1, the facsimile apparatus of this embodiment is a terminal apparatus constituting an ISDN terminal system in the basic interface of an ISDN. Further, the facsimile apparatus of this embodiment has structural elements the same as those of the facsimile apparatus according to the first embodiment shown in FIG. 2. Accordingly, the positioning of this facsimile apparatus in the ISDN terminal system and the structural elements thereof need not be described in detail again.

Figure 7:
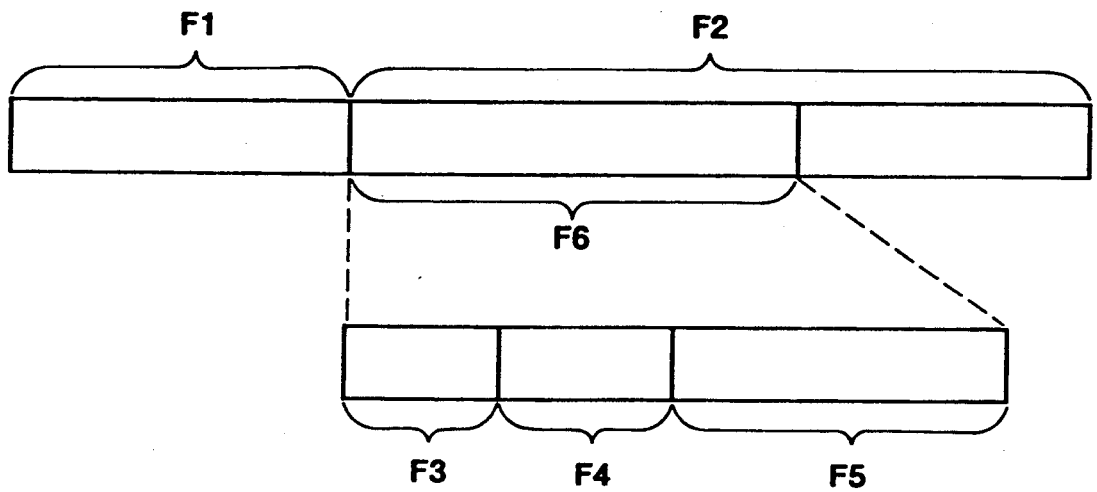
FIG. 7 is a diagram illustrating an ISDN number system in the facsimile apparatus of the second embodiment.

FIG. 7 illustrates an ISDN number system in the facsimile apparatus of this embodiment.

As shown in FIG. 7, F1 represents a subscriber number section indicating a subscriber number, and F2 a subaddress section. A confidentiality information section F6 constituting part of the subaddress section F2 comprises a confidentiality designating command section F3 for designating the presence of a confidential document, a storage area number section F4 for designating a storage area in the memory unit 208 in which a confidential document is to be stored, and a secret number section F5 which designates a secret number for specifying the person who is to receive a document on the receiving side.

Processing for storing a confidential document in the facsimile apparatus of this embodiment will now be described in accordance with the flowchart shown in FIG. 8.

Figure 8:
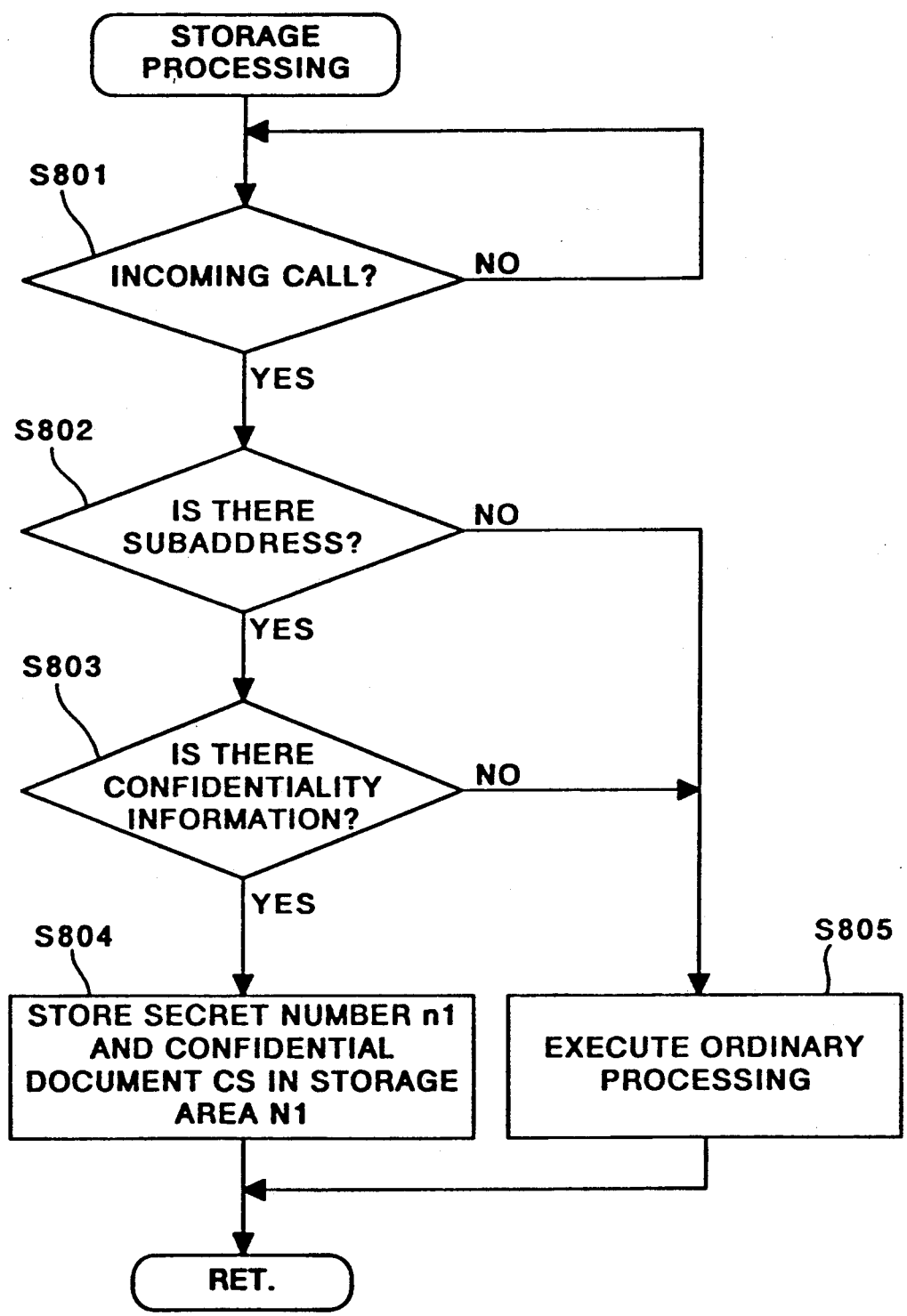
FIG. 8 is a flowchart illustrating confidential document storage processing in the facsimile apparatus of the second embodiment.

A step S801 in FIG. 8 calls for the communication controller 206 to sense whether an incoming-call signal has been received from the ISDN bus line 2. When the communication controller 206 senses an incoming call, the microprocessor 207 determines at step S802 whether a subaddress is present in the received signal. If it is determined that the received signal contains a subaddress, the microprocessor 207 determines at step S803 whether confidentiality information is contained in the subaddress received. That is, it is determined whether the confidentiality designating command section F3 of subaddress section F2 is designating confidentiality.

If it is decided that there is no subaddress or confidentiality information at steps S802, S803, then the image signal obtained by decoding the received document in the coder/decoder 205 is stored in the buffer memory 204, after which the image signal is fed into the printer controller 213 from the buffer memory 204 and ordinary facsimile reception processing is executed at step S805 to print the image on the recording paper 203a by means of the printer 203.

If it is decided at step S803 that a confidentiality designation is contained in the confidentiality designating command section F3 of subaddress section F2, confidentiality processing is executed at step S804. That is, the storage area number section F4 is analyzed and the received secret number (referred to as "n1") and received confidential document (referred to as "CS") are stored in a storage area (referred to as "N1") of the memory unit 208 designated by number section.

Thus, unlike ordinary reception processing, the output of the received confidential document from the printer 203 is not delivered at this stage, and the receiving operation is terminated.

Figure 9:
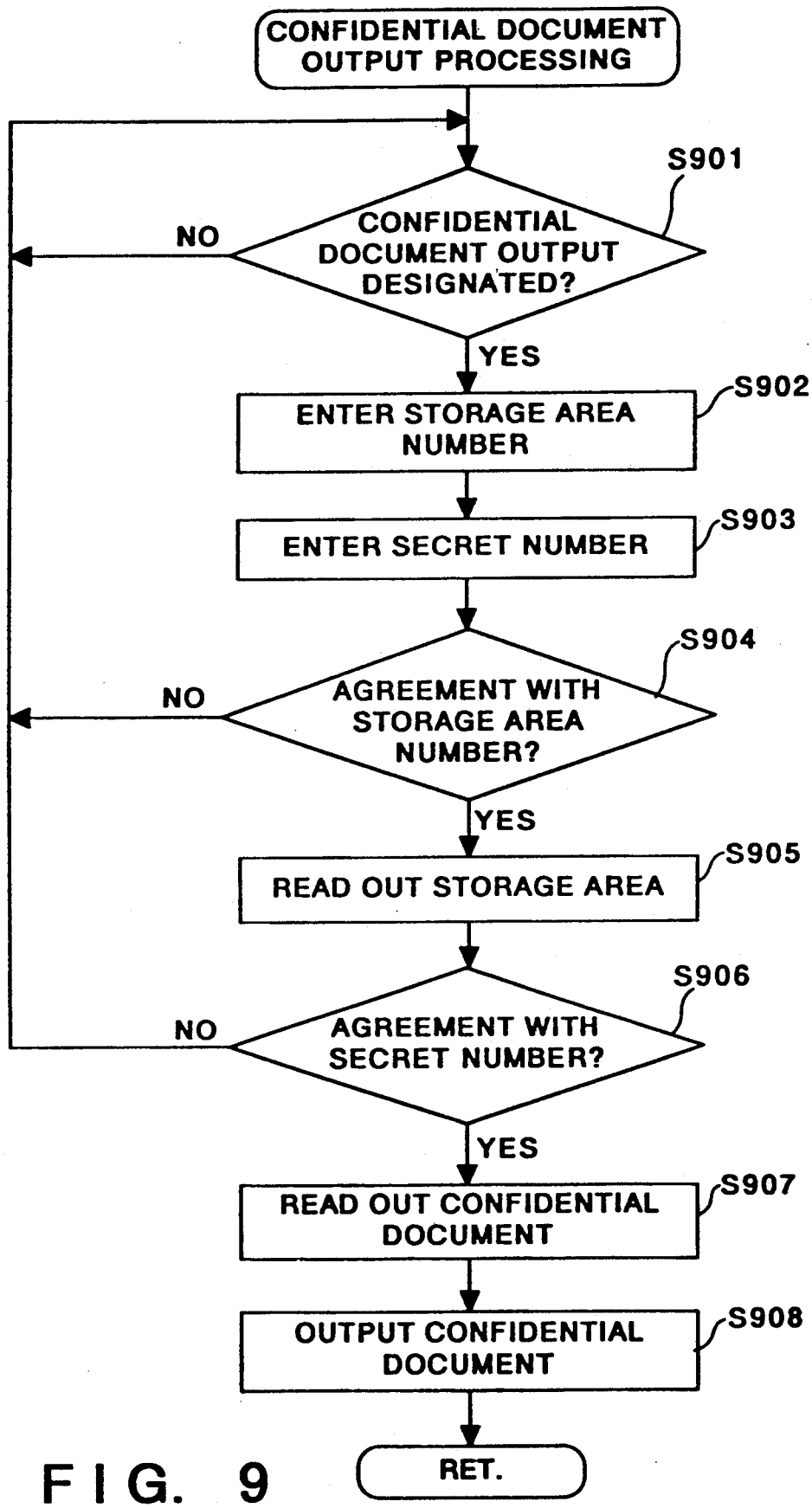
FIG. 9 is a flowchart illustrating output processing of a received document in the facsimile apparatus of the second embodiment.

FIG. 9 is a flowchart showing processing for outputting a confidential document with the facsimile apparatus that has received a confidential document as described above.

Step S901 calls for the microprocessor 207 to determine whether output of a confidential document has been designated by the operator using the control panel 201. If it is determined that output of the confidential document has been designated, the system then waits for the operator to enter a storage area number and a secret number from the control panel 201. Specifically, input of the storage area number (N) is received at step S902, then input of the secret number (n) is received at step S903. Following entry of the secret number, the microprocessor 207 determines at step S904 whether the storage area (N) is present. If the storage area (N) is present in the memory unit 208, namely if (N)=N1 holds, this storage area is read out at step S905, then it is determined at step S906 whether the secret number n1 contained in the read storage area agrees with the secret number (n) entered from the control panel 201. If (n)=n1, the program proceeds to the next step S907. Here the confidential document contained in the area N is read out and decoded by the coder/decoder 205, with the result being stored in the buffer memory 204.

Next, at step S908, the confidential document data are read out successively from the buffer memory 204, sent to the printer 203 via the printer controller 213, and recorded on the recording paper 203a. If it is found at step S904 that the inputted storage area is not present in the memory unit 208, or if it is found at step S906 that there is no secret number that agrees with the inputted secret number, then the program returns to step S901.

Thus, as described above, the facsimile apparatus on the receiving side controls the storage and output of a confidential document in accordance with confidentiality information that uses subaddresses. Therefore, if the facsimile apparatus on the sending side merely possesses a function for transmitting subaddresses, it will be possible to send and receive confidential documents. In addition, a secret number set on the receiving side also can be designated on the sending side.

It should be noted that while the foregoing embodiment has been exemplified in case of a facsimile apparatus, the invention is not limited to this embodiment. The invention can be similarly applied to communication terminal apparatus other than a facsimile apparatus, such as a telex apparatus, by way of example.

Third Embodiment

A third embodiment will now be described.

In the same manner as the facsimile apparatus of the first embodiment shown in FIG. 1, the facsimile apparatus of this embodiment is a terminal apparatus constituting an ISDN terminal system in the basic interface of an ISDN. Accordingly, the positioning of this facsimile apparatus in the ISDN terminal system need not be described in detail again.

Figure 10:
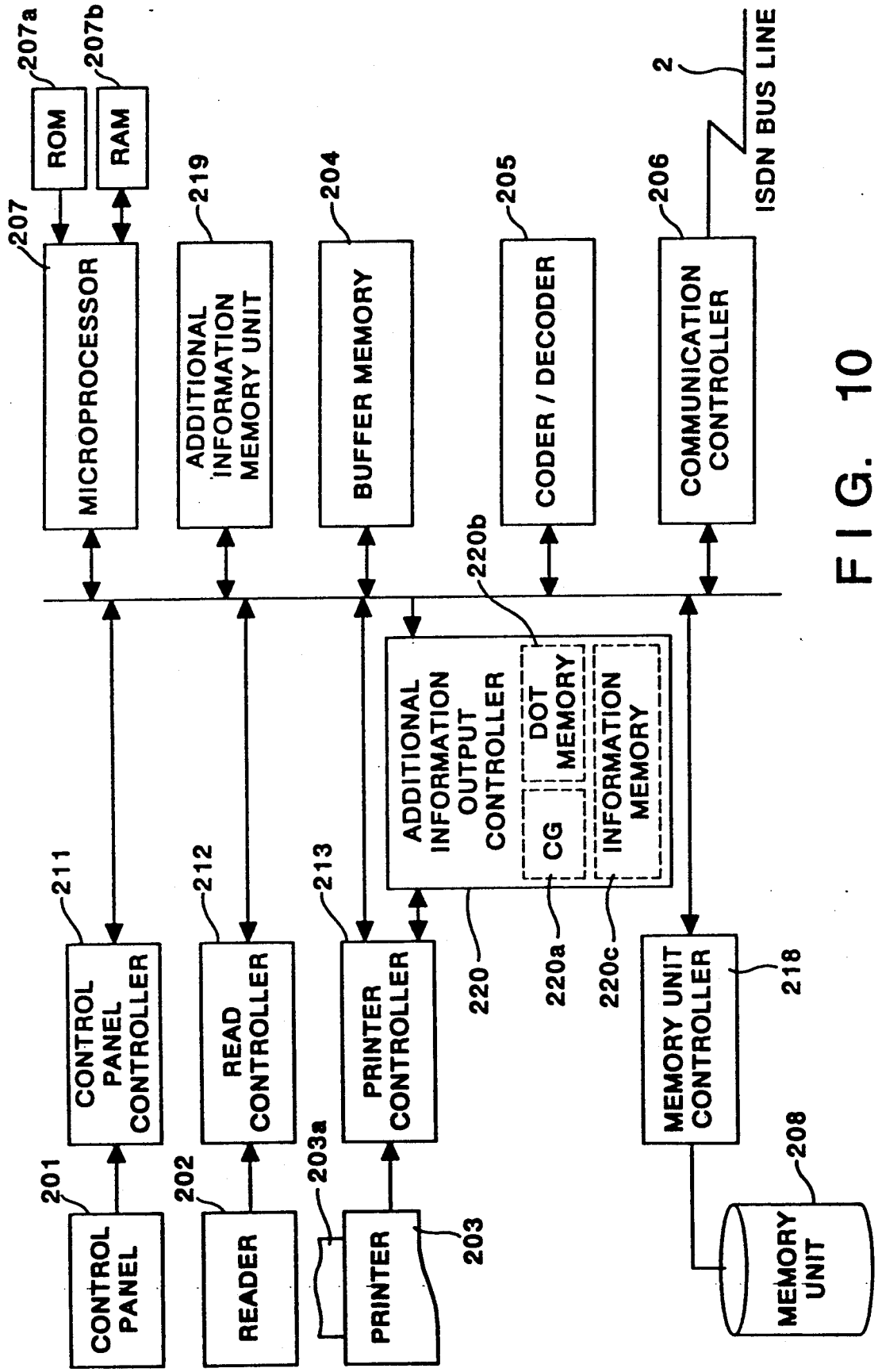
FIG. 10 is a block diagram illustrating the construction of a facsimile apparatus according to a third embodiment.

FIG. 10 is a block diagram showing the construction of the facsimile apparatus of this embodiment. Structural elements the same as those of the facsimile apparatus shown in FIG. 1 are designated by like reference characters and a detailed description thereof is omitted. The facsimile apparatus of this embodiment also is based on the ISDN number system shown in FIG. 3.

In FIG. 10, the microprocessor 207 controls the overall operation of the facsimile apparatus and stores destination information, which is additional information corresponding to each subaddress, in an additional information memory unit 219 in the form of a character code, as will be described below. An additional information output controller 220 records additional information on the recording paper 203a of printer 203. The output controller 220 has a character generator (CG) 220a, a dot memory 220b, and an information memory 220c. Additional information (a code signal) stored in the information memory 220c is converted into a dot signal using the character generator (CG) 220a, and the dot signal is stored in the dot memory 220b.

FIG. 11 illustrates the structure of a table of additional information corresponding to subaddresses. F11 represents 3-digit decimal subaddresses, and F12 denotes additional destination information corresponding to respective ones of the subaddresses.

For example, additional information "Mr. AB" is assigned to subaddress 000, additional information "CD Section" to subaddress 001, additional information "CD Section Chief" to subaddress 002, and additional information "Mr. GH" to subaddress 003. The destinations F12 are thus assigned to respective subaddresses F11 in advance. These items of additional information are stored in the form of character codes.

Figure 12:
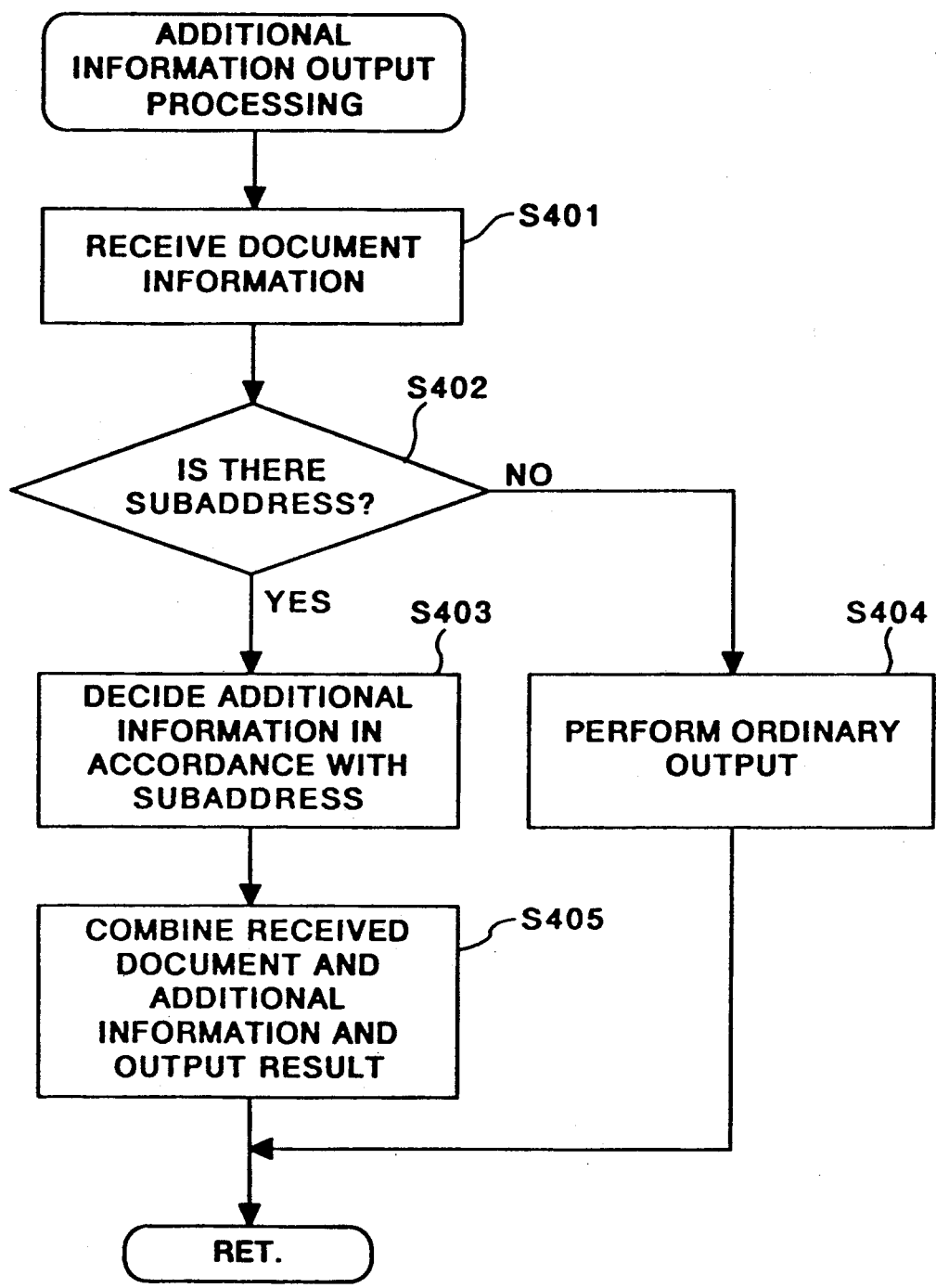
FIG. 12 is a flowchart illustrating processing for outputting additional information in the facsimile apparatus of the third embodiment.

The processing procedure for outputting the additional information executed by the microprocessor 207 of the facsimile apparatus of this embodiment will now be described in accordance with the flowchart shown in FIG. 12.

When document information is received via the communication controller 206 at step S401, the microprocessor 207 determines at step S402 whether there is a subaddress. If there is no subaddress, then the received signal is decoded by the coder/decoder 205 and stored in the buffer memory 204 at step S404. The microprocessor then controls the printer controller 213, successively reads the stored signal out of the buffer memory 204 and delivers the data to the printer 203. As a result, recording is performed on the recording paper 203a in the ordinary manner using the printer 203.

It should be noted that when recording of the received information cannot be performed immediately by the printer 203, the microprocessor 207 controls the memory unit controller 218 to store the received document in the memory unit 208. When the printer 203 is capable of being used, the stored information is read out and recorded.

When a subaddress is found to exist at step S402, the program proceeds to step S403 to decide the additional destination information in accordance with the subaddress. More specifically, the received subaddress is stored in the RAM 207b, the received subaddress and the subaddresses F11 of the additional information memory unit 219 are compared, and the additional information F12 corresponding to the subaddress F11 for which agreement has been found is stored in the information memory 220c provided in the additional information output controller 220. For example, if the received subaddress is 003, then 003 is stored in the RAM 207b, after which the additional information memory unit 219 is searched, the additional information "Mr. GH" is read out, and "Mr. GH" expressed in the form of a character code is stored in the information memory 220c of the additional information output controller 220.

When the foregoing processing is terminated, the program proceeds to step S405, where the additional information is added onto the received document and the resulting information is outputted. Specifically, the control state of the printer controller 213 is monitored by the additional information output controller 220 and control is carried out in such a manner that the additional information stored in the additional information output controller 220 is outputted to a predetermined position on the recording paper 203a.

Figure 13:
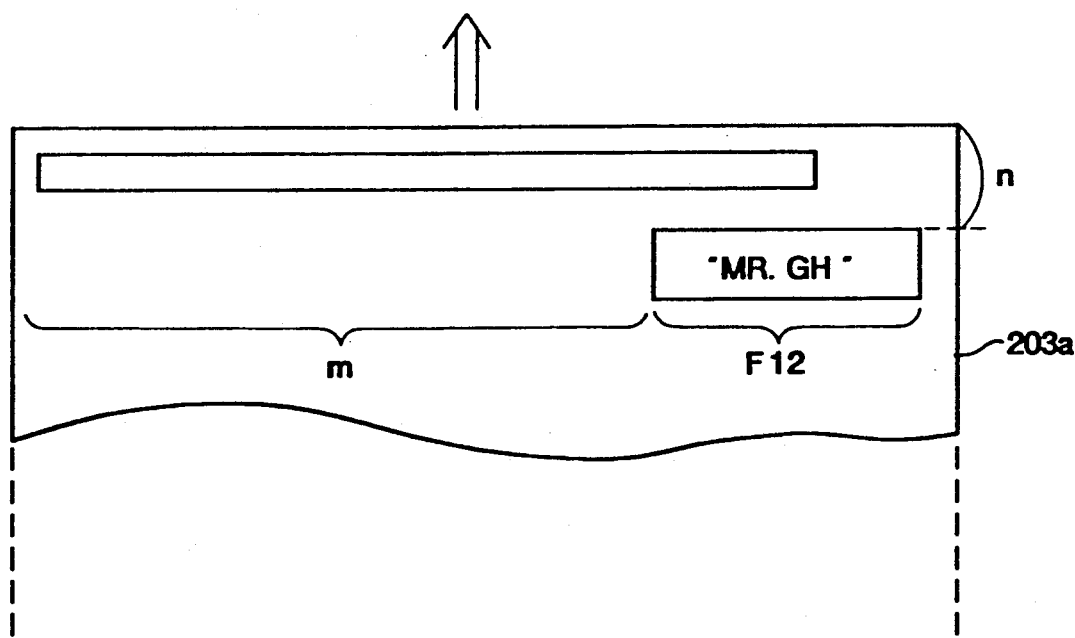
FIG. 13 is a diagram illustrating the state in which additional information is recorded on recording paper in the facsimile apparatus of the third embodiment.

FIG. 13 shows the state in which additional information is recorded on the recording paper 203a when the received subaddress is 003. The additional information "Mr. GH" corresponding to the subaddress 003 is recorded on the recording paper at a position starting at an n-th scanning line from the beginning of the recording and at an m-th dot from the left edge of the recording. It should be noted that the information relating to the recording starting position on the recording paper is stored beforehand in the RAM 207b. The microprocessor 207 sends the position information to the additional information output controller 220 whenever the additional information is outputted.

Thus, in accordance with the present embodiment as described above, additional information in accordance with a subaddress can be recorded by the facsimile apparatus on the receiving side. This makes it possible to determine at a glance for whom a received document is intended without reading the contents of the received document.

In the above-described embodiment, the additional information is stored in the additional information memory unit 219 in the form of a character code. However, image data comprising dots can be stored instead of a code signal.

In such case, the character generator (CG) 220a provided in the additional information output controller 220 will be unnecessary.

As many apparently widely different embodiments of the present invention can be made without departing from the spirit and scope thereof, it is to be understood that the invention is not limited to the specific embodiments thereof except as defined in the appended claims.

What is claimed is:

1. A communication terminal apparatus connected to an ISDN for sending and receiving information inclusive of confidentially information at a subaddress, said subaddress, which is contained at an ISDN address to be used for discriminating a terminal connected to the ISDN, being used for discriminating a plurality of terminals connected to a subscriber line of the ISDN, said communication terminal apparatus comprising:

subaddress discriminating means for determining whether a subaddress which comes after a subscriber number is contained at a received ISDN address;

subaddress analyzing means for analyzing whether confidentially information is contained at a subaddress discriminated by said subaddress discriminating means;

received information storing means for storing received information in accordance with contents of the confidentially information analyzed by said subaddress analyzing means;

output designating means for designating output of the received information stored in said received information storing means;

information comparing means for comparing the designation from said output designating means with the confidentially information contained at the subaddress; and received information output means for outputting the received information stored in said received information storing means based on result of the comparison performed by said information comparing means.

2. The apparatus according to claim 1, wherein said confidentiality information contains information indicating whether received information is to be treated as being confidential, information indicating a storage area of the received information, and a secret number.

3. The apparatus according to claim 1, wherein the designation from said output designating means includes a storage area of the received information, and a secret number.

4. The apparatus according to claim 1, wherein said received information output means outputs the received information in a case where the result of the comparison performed by said information comparing means is that the designation from said output designating means and the confidentiality information contained at the subaddress agree.

5. A communication terminal apparatus connected to an ISDN for sending and receiving information, comprising:

destination information storing means for storing destination information corresponding to a subaddress, said subaddress, which is contained at an ISDN address to be used for discriminating a terminal connected to the ISDN, being used for discriminating a plurality of terminals connected to a subscriber line of the ISDN;

subaddress discriminating means for determining whether a subaddress which comes after a subscriber number is contained at a received ISDN address;

destination information extracting means for extracting, from said destination information storing means, destination information corresponding to a subaddress discriminated by said subaddress discriminating means;

destination information appending means for appending destination information, which is extracted by said destination information extracting means, to the received information; and position information memory means for storing a position at which the destination information, appended by said destination information appending means, is to be recorded on a recording paper.

6. The apparatus according to claim 5, wherein the recording position of the destination information on the recording paper can be set at will by changing position information in said position information memory means.

7. A communication terminal apparatus connected to an ISDN for sending and receiving information, comprising:

first processing means for outputting communication information, which has been sent from another party's apparatus and stored in memory, in accordance with an operator's instructions to output information from the memory;

second processing means for outputting communication information, which has been sent from another party's apparatus, without an operator's instructions to output information;

a table for storing data that designates an execution of output processing by said first processing means or by said second processing means in accordance with a subaddress contained at an ISDN address;

receiving means for receiving an ISDN address and communication information sent from another party's apparatus;

determination means for determining, when an ISDN address received by said receiving means contains a subaddress, whether an output processing to output communication information received by receiving means is executed by said first processing means or by said second processing means based upon the subaddress and data stored in said table.

8. The apparatus according to claim 7, wherein said table stores data that designates a memory area for storing communication information received by said receiving means, and a secret number corresponding to a subaddress.

9. The apparatus according to claim 8, wherein said first processing means includes discriminating means for determining whether data, which has been inputted by an operator and designates the memory area and the secret number, agrees with data stored in advance in the table, and wherein said first processing means outputs data stored in the memory area corresponding to said data inputted by operator when agreement is determined.

* * * * *

UNITED STATES PATENT AND TRADEMARK OFFICE
CERTIFICATE OF CORRECTION

PATENT NO. : 5,130,818
DATED : July 14, 1992
INVENTOR(S) : YOSHIHISA TADOKORO

It is certified that error appears in the above-identified patent and that said Letters Patent is hereby corrected as shown below:

COLUMN 1

Line 9, "Network," should read --Network, for performing--.

COLUMN 5

Line 34, "printer" should read --printer 203.--

COLUMN 10

Line 51, "confidentially" should read --confidentiality--.
Line 62, "confidentially" should read --confidentiality--.
Line 67, "confidentially" should read --confidentiality--.

COLUMN 11

Line 6, "confidentially" should read --confidentiality--.

UNITED STATES PATENT AND TRADEMARK OFFICE
CERTIFICATE OF CORRECTION

PATENT NO. : 5,130,818
DATED : July 14, 1992
INVENTOR(S) : YOSHIHISA TADOKORO

It is certified that error appears in the above-identified patent and that said Letters Patent is hereby corrected as shown below:

COLUMN 12

Line 29, "apparatus;" should read --apparatus; and--.

Signed and Sealed this

Seventh Day of September, 1993

Attest:

BRUCE LEHMAN

Attesting Officer

Commissioner of Patents and Trademarks